United States Patent [19]

Chen et al.

[11] Patent Number: 5,070,337
[45] Date of Patent: Dec. 3, 1991

[54] OPTIMIZATION METHOD AND AN OPTIMIZED FILTER FOR SIDELOBE SUPPRESSION

[76] Inventors: Xiao H. Chen, Rakentajantie 5 F 204, 90570 Oulu; Juhani Oksman, Lyijytie 6B, 90250 Oulu, both of Finland

[21] Appl. No.: 681,329
[22] Filed: Apr. 5, 1991
[51] Int. Cl.⁵ .............................. G01S 7/28
[52] U.S. Cl. .................. 342/201; 342/132; 342/145
[58] Field of Search ............... 342/132, 145, 201

[56] References Cited
U.S. PATENT DOCUMENTS 4,095,225 6/1978 Erikmats .
4,379,295 4/1983 Lewis et al. .
4,566,010 1/1986 Collins .

Primary Examiner—Mark Hellner
Attorney, Agent, or Firm—Ladas & Parry

[57] ABSTRACT

An optimization method for sidelobe suppression filters, and a filter utilizing a binary coding waveform are formulated. The method comprises expanding the frequency transfer function of an ideal sidelobe suppression filter into a polynomial series; truncating the polynomial series into a finite-termed polynomial series with unknown weighting coefficients A,B,C,D..., using the inverse Fourier transform to convert the finite-termed polynomial series into the corresponding pulse response in the time domain; then using the LP algorithm to minimize the output peak sidelobes to determine all the weighting coefficients A, B, C, D... and inserting them back to the inverse transfer function of the optimized filter.

12 Claims, 2 Drawing Sheets

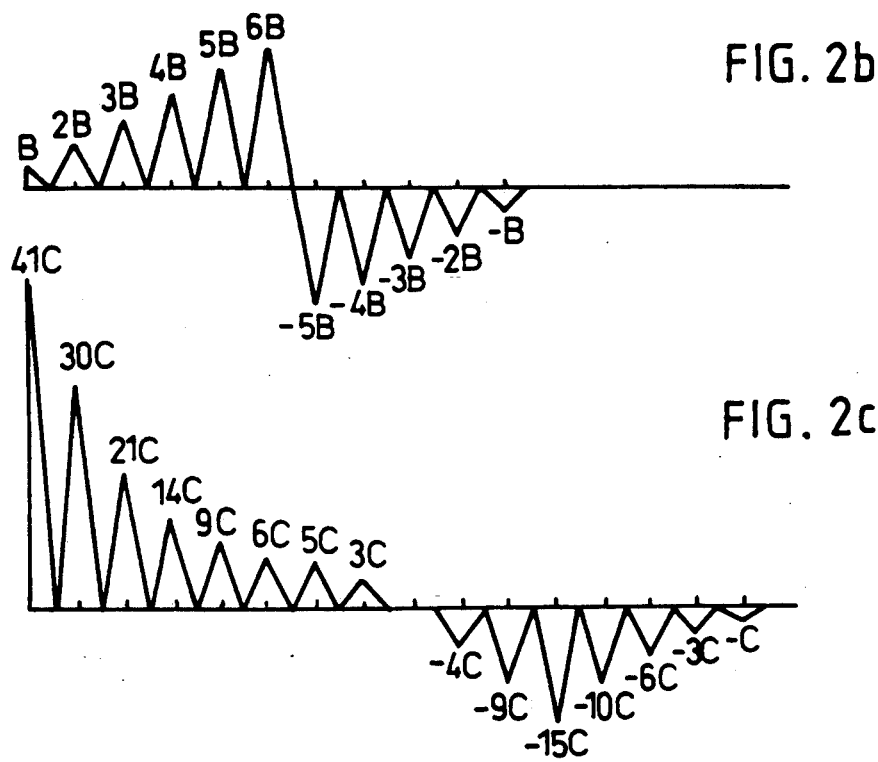
FIG. 2a
FIG. 2b
FIG. 2c
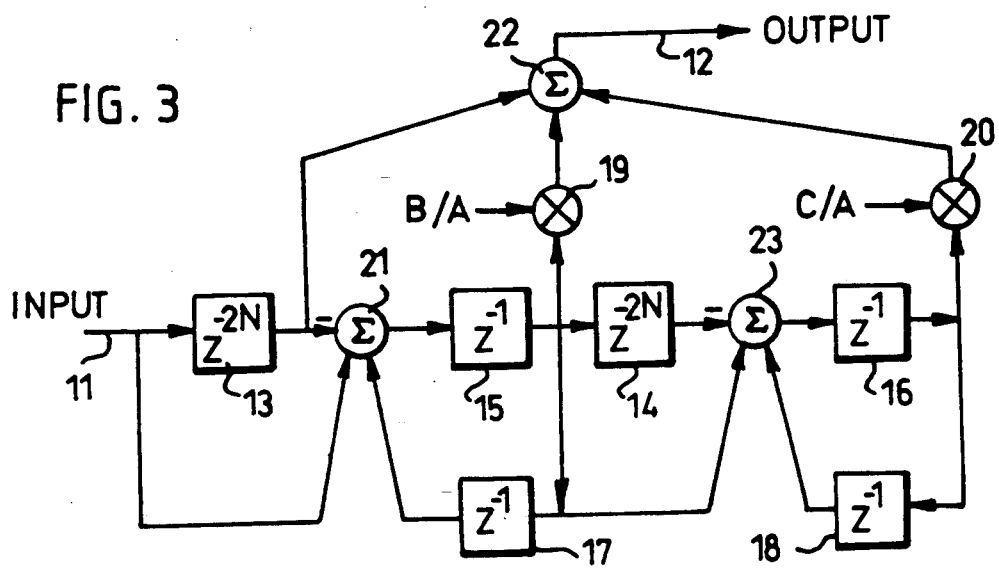
FIG. 3

OPTIMIZATION METHOD AND AN OPTIMIZED FILTER FOR SIDELOBE SUPPRESSION

FIELD OF THE INVENTION

This invention relates to sidelobe suppression filters in binary coded radar systems.

BACKGROUND OF THE INVENTION

Today, binary coded radar systems are used for both civilian and military purposes In radar systems, the Barker code is one of the most commonly used binary phase-coded waveforms, because it has a relatively high ratio between its mainlobe and sidelobes, and the length of the code is also relatively short. The maximum length of the Barker code is 13. When using the Barker code and the pulse compression technique, it is also possible to achieve a better range resolution. The invention can be applied in various radar systems, such as MTI (Moving Target Indicator), PD (Pulse-Doppler) and SAR (Synthetic Aperture Radar) systems. Barker coding waveforms are sometimes used also in spread spectrum communication.

This invention is also applicable with other binary coding waveforms, such as truncated PN sequences and concatenated codes.

When considering the Barker code as a pulse compression waveform, the sidelobe level of the Barker code after matched filtering should be suppressed to a certain low level to be able to achieve a good resolution for ranging and speed measuring. That is why the optimization of a sidelobe filter is a matter of great importance in modern radar systems. Without suppression, the peak sidelobe level for a 13 bit Barker code is only 22.3 dB lower than the mainlobe level, and this is not sufficiently low for most radar applications.

There are mainly three possible ways to design a Barker code sidelobe suppression filter. The first two methods are called LMS and LP methods In these methods, a mismatched filter is designed for the Barker code-signal directly, instead of first using a matched filter to perform the pulse compression correlation and then suppressing the sidelobes later. Both the LP algorithm and the LMS algorithm are usable when synthesizing the filters in the time domain.

By the LMS (Least Mean Square) algorithm, the LMS filter is designed to replace the Barker code matched filter. The LMS mismatched filters for the Barker code are utilized to minimize the least mean square of the sidelobe, that is to say to minimize the average energy of the sidelobe. Minimizing the average energy of the sidelobe is not enough, because it does not assure that the peak sidelobe is minimized. In radar applications, a high peak sidelobe of a strong target echo can sometimes mask the mainlobe of a weak target echo. Also, the LMS sidelobe suppression filters are complex in their filter structure. The LMS technique is presented in the publication: M. H. Ackroyd and F. Ghani, Optimum Mismatched Filters for Sidelobe Suppression, IEEE Transactions on Aerospace and Electronic systems, Vol AES-9, No. 2, March 1973, pp. 214-218.

Another prior method of designing a mismatched filter for the Barker codes utilizes LP algorithm (Linear Programming). Linear Programming techniques are utilized to determine the optimal filter weights in order to minimize the peak range sidelobes of a binary phase-coded waveform such as the Barker code. The output peak sidelobes of the filters designed by the LP algorithm are lower than those of the filters designed by the LMS algorithm. Another problem with the LP technique is the complexity of the filter structure. For example, when using a 13 bit Barker code, at least 20 tapped delay elements are needed in the filter to obtain an acceptable performance. The LP technique is presented in the publication: S. Zoraster, Minimum Peak Range Sidelobe Filters for Binary Phase-Coded Waveforms, IEEE Transactions on Aerospace and Electronic Systems, Vol AES-16, No. 1, January 1980, pp. 112-115.

The third sidelobe reduction filter design method is to synthesize, in the frequency domain, a R-G filter, which is a separate sidelobe suppression filter connected to the matched filter. The hardware structure of the R-G filter is relatively simple as compared with LMS and LP filters, but its performance is not as good as that of the LP filters. It should also be pointed out that the R-G filters can only be used for the Barker codes with positive sidelobes. For example, an 11 bit Barker code has negative sidelobes, thus the R-G filters cannot be used for it. The R-G filters are presented in the publication: A. W. Rihaczek, R. M. Golden, Range Sidelobe Suppression for Barker Codes, IEEE Transactions on Aerospace and Electronic Systems, Vol AES-7, No. 6, Nov. 1971, pp. 1087-1092.

SUMMARY OF THE INVENTION

Therefore, it is a principal object of the present invention to provide a new method of designing Barker code sidelobe suppression filters in order to enhance the capability of the suppression of the sidelobe.

Another object of the invention is to provide a relatively simple hardware structure of the filter while achieving promising performance.

As used herein, good performance means the capability of the filter to suppress both the positive and the negative sidelobe and to keep the peak sidelobe to a minimum. The present invention can be utilized for other kinds of binary codes in addition to the Barker code, such as for truncated PN sequences and concatenated codes.

In order to achieve the above-mentioned objects, the optimization method for sidelobe suppression according to the present invention suggests designing the sidelobe suppression filter in both the time domain and the frequency domain. The filter is first synthesized in the frequency domain using a finite-termed polynomial series to approximate the transfer function of the ideal sidelobe suppression filter for a binary phase-coded waveform, such as the Barker code, truncated PN sequence or concatenated code. The approximated transfer function contains coefficients A, B, C, D... the values of which are unknown so far. Then, by using the inverse Fourier transform, the finite-termed polynomial series of the filter in the frequency domain is converted into the time domain. In the time domain, the LP algorithm is applied to calculate the coefficients of the inverse filter sequence so as to minimize peak sidelobe outputs. The obtained coefficients are put back to the inverse transfer function of the sidelobe filter to assure an optimal performance for the sidelobe suppression.

It is still another object of this invention to realize a sidelobe suppression filter for pulse compression radar systems utilizing an 11 or 13 bit Barker code. In order to achieve the above-mentioned object, the filter and the certain coefficients in the transfer function $H(f)$ of the filter are optimized so as to minimize the output peak sidelobe.

The above-mentioned features and objects of the invention will become more apparent by reference to the following description and the accompanying drawings. The reference R-Gopt in the following text is used to represent the new optimized filter for sidelobe suppression.

BRIEF DESCRIPTION OF THE DRAWINGS

FIGS. 2 a, b and c are diagrams showing (R-G-2)$_{opt}$ filter output waveforms for an 11 bit Barker code.

FIG. 3 is a block diagram of an (R-G-2)$_{opt}$ filter designed by the new optimization method.

DETAILED DESCRIPTION OF THE DRAWINGS

Figure 1:
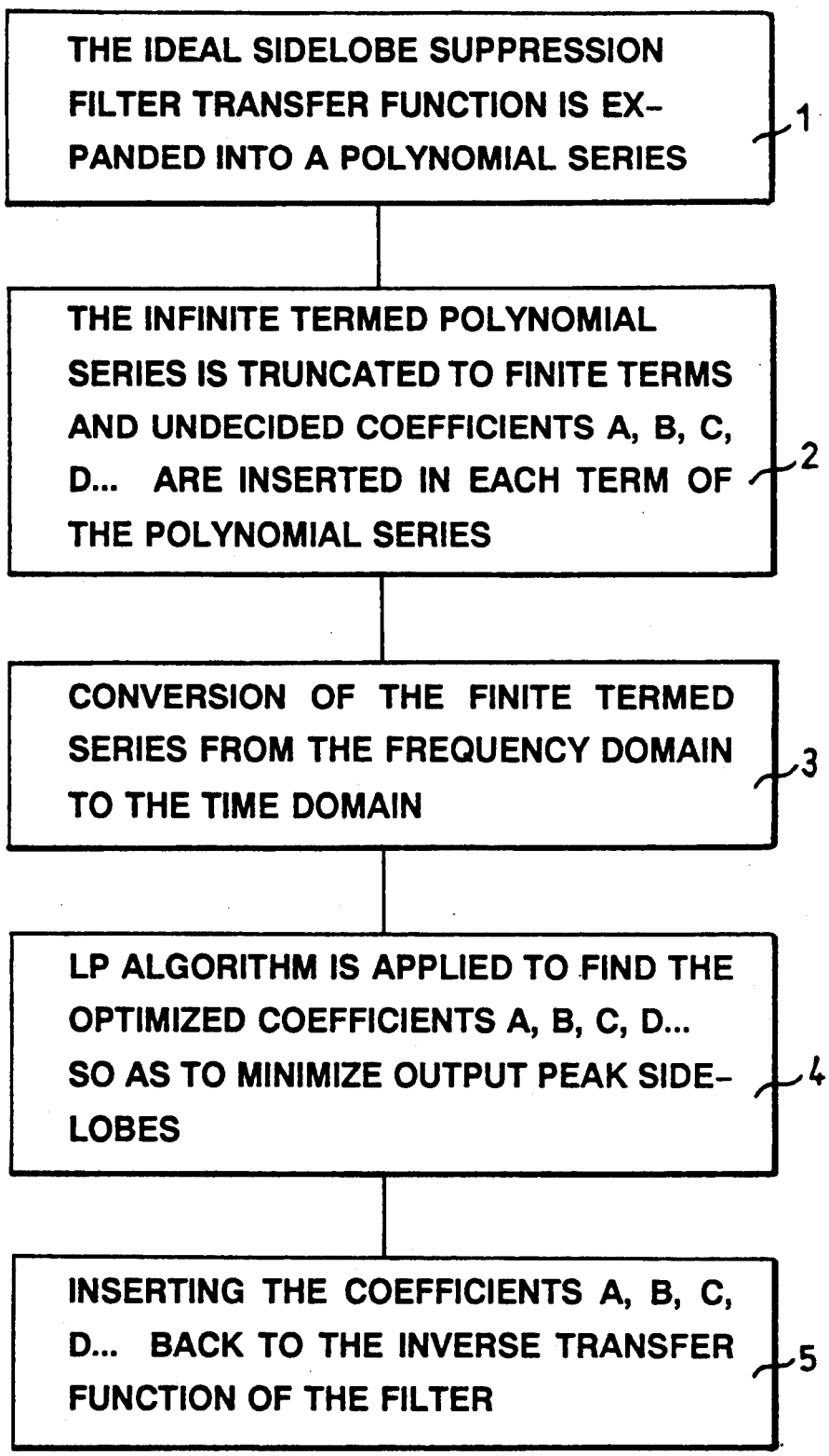
FIG. 1 is a flow chart of an optimization method for a sidelobe suppression filter according to the invention.

FIG. 1 shows the flow chart of the optimization method for sidelobe suppression filters. The first step is to use an infinite-termed polynomial series to represent the transfer function of the ideal sidelobe suppression filter. In step 1, the ideal sidelobe suppression filter transfer function H(f) is expanded into a polynomial series. The polynomial series is an approximation of the transfer function H(f). The infinite termed polynomial series is then truncated into finite terms (according to the accuracy required) and the undecided coefficients A, B, C, D ... are inserted into each term. Then H(f) can be written $$H(f) \approx A + B \frac{\sin(2\pi fNT)}{\sin(2\pi fT)} + C \left( \frac{\sin(2\pi fNT)}{\sin(2\pi fT)} \right)^2 + D \left( \frac{\sin(2\pi fNT)}{\sin(2\pi fT)} \right)^3 \quad (5)$$

where A, B, C and D are the weighting coefficients of each term, f is the frequency, N is the length of the binary code (Barker code), and T is the width of subpulse of the Barker code. In step 3, the finitetermed polynomial series of the filter in the frequency domain is converted to the time domain by the Fourier transform. In step 4, the LP algorithm is applied in the time domain to optimize the coefficients A, B, C, D. In step 5, the coefficients are inserted back to the inverse transfer function of the sidelobe suppression filter.

In the following, an 11 bit Barker code will discussed as an example. Assume that the Barker code possesses the autocorrelation function R(t) consisting of the contribution of the mainlobe, such as the subfunction R$_m$(t), and the contribution of the sidelobes, such as the subfunction R$_s$(t). The convolution of the two subfunctions can be written:

$$R(t) = R_m(t) * R_s(t) \quad (1)$$

The energy density spectrum of the 11 bit Barker code is obtained by using the Fourier transform;

$$E(f) = E_m(f) E_s(f) \quad (2a)$$

where $$E_m(f) = T \frac{\sin^2(\pi fT)}{(\pi fT)^2} \quad (2b)$$

$$E_s(f) = N + 1 - \frac{\sin(2\pi fNT)}{\sin(2\pi fT)} \quad (2c)$$

E$_m$(f) and E$_s$(f) represent the spectrum contributions of the main lobe and the sidelobes, respectively. It is obvious that if we could find a network which has a transfer function 1/E$_s$(f), then the sidelobes in every range cell would vanish. Often it is rather difficult to synthesize a filter with a transfer function exactly equal to 1/E$_s$(f). But the closer the filter transfer function approximates 1/E$_s$(f), the lower the peak output sidelobe will be. From (2c) we obtain for the required transfer function:

$$H(f) = \frac{1}{E_s(f)} = \frac{1}{N + 1 - \frac{\sin(2\pi fNT)}{\sin(2\pi fT)}} \quad (3)$$

The following inequality is true for any value of f $$\frac{1}{N+1} \frac{\sin(2\pi fNT)}{\sin(2\pi fT)} < 1 \quad (4)$$

So (3) can be expanded into a convergent polynomial series. For the sake of simplicity, only the first four terms of the series will be retained in H(f). That is, $$H(f) \approx A + B \frac{\sin(2\pi fNT)}{\sin(2\pi fT)} + C \left( \frac{\sin(2\pi fNT)}{\sin(2\pi fT)} \right)^2 + D \left( \frac{\sin(2\pi fNT)}{\sin(2\pi fT)} \right)^3 \quad (5)$$

where A, B, C and D are unknown coefficients and will be determined later. If we let A, B ≠ 0, C = D = 0, then H(f) will be a first order polynomial approximation, resulting in an (R-G-1)$_{opt}$ filter; if A, B, C ≠ 0, and only D = 0, then H(f) will be a second order approximation, resulting in an (R-G-2)$_{opt}$ filter, and so forth. Obviously, the higher the order of the approximating polynomial, the lower the peak output sidelobe will be and, of course, the more complicated the filter structure will be.

In order to utilize the linear programming algorithm to solve the unknown coefficients A, B, C and D above, we transform H(f) to its impulse response by an inverse Fourier transform. We note that $$\frac{\sin(2\pi fNT)}{\sin(2\pi fT)} <=> \sum_{n=-\frac{N-1}{2}}^{\frac{N-1}{2}} \delta(t - 2nT) \quad (6)$$

So the impulse response corresponding to H(f) is of the form $$h(t) = A\delta(t) + B \sum_{n=-\frac{N-1}{2}}^{\frac{N-1}{2}} \delta(t - 2nT) + C \sum_{n=-N+1}^{N-1} (N - |n|)\delta(t - 2nT) + \quad (7)$$

-continued $$D\left(\sum_{n=-N+1}^{N-1} (N - |n|)\delta(t - 2nT)\right) *$$

$$\left(\sum_{m=-\frac{N-1}{2}}^{\frac{N-1}{2}} \delta(t - 2mT)\right)$$

We see that h(t) is a delta function sequence and can be sampled every 2T seconds. The sampled sequence will be a discrete set $\{h_i\}$ (i=0, ±1, ±2, ... ). If we let the input signal be the discrete autocorrelation sequence of the Barker code $\{R_i\}$, it will be for an 11 bit Barker code:

$$R_i = \begin{cases} N & i = 0 \\ -1 & i = \pm 2, \pm 4, \ldots \pm 10 \\ 0 & e.w. \end{cases} \quad (8)$$

The discrete convolution between $\{h_i\}$ and $\{R_i\}$ $$\{y_i\} = \{R_i\} * \{h_i\} \quad i=0, \pm 1, \pm 2, \ldots \quad (9)$$

is the output waveform of the sidelobe suppression filter. For the sake of convenience, we discard the fourth term in (7), i.e. let D=0. By (9) we will get a linear programming model for an (R-G-2)$_{opt}$ filter. The output waveform of (9) is shown in FIG. 2, in which FIG. 2(a) shows the convolution between the first term in (7) and R(t), FIG. 2(b) the second term in (7) and R(t), and FIG. 2(c) the third term and R(t).

From the sum of the three waveforms in FIG. 2, we obtain the following linear programming model, in which the objective function is $$J = \text{Max}(11A + B + 41C) \quad (10a)$$

and is subject to the constraints $$\begin{aligned}
|-A + 2B + 30C| &\leq 15 \\
|-A + 3B + 21C| &\leq 15 \\
|-A + 4B + 14C| &\leq 15 \\
|-A + 5B + 9C| &\leq 15 \\
|-A + 6B + 6C| &\leq 15 \\
|-5B + 5C| &\leq 15 \\
|-4B + 3C| &\leq 15 \\
|-3B| &\leq 15 \\
|-2B - 4C| &\leq 15 \\
|-B - 9C| &\leq 15 \\
|-15C| &\leq 15, \\
A, B, C &\geq 0.
\end{aligned} \quad (10b)$$

The above equations can be solved by an iterative Simplex LP algorithm to obtain the coefficients A, B, and C. The optimized sidelobe suppression filter (R-G-2)$_{opt}$ is obtained by inserting the coefficients back to (5).

In the following table 1, the filter designed by the new method and the prior art methods are compared. It should be noted that the peak sidelobe suppression level for the filter designed by the new method is improved by 2.62 dB as compared with the ordinary R-G filters. Table 1 also shows the performance of the ordinary LS filters and LP filters.

TABLE 1

The performance comparisons between the new filter and prior art reported

|  | LS filter | LP filter | R-G filter | New filter |
|---|---|---|---|---|
| Peak sidelobe suppression (dB) | −34.80 | −40.00 | −43.80 | −46.42 |
| Mean sidelobe suppression (dB) | −44.20 | −40.10 |  | −58.5 |
| LSNR (dB) | −0.20 | −0.18 |  | −0.14 |
| Delay elements needed | 33 | 33 | 6 | 6 |
| Multiplication units needed | 33 | 33 | 2 | 2 |

LSNR: The loss in signal to noise ratio.
The LS and LP filters here consist of 33 tapped delay elements, the R-G filter and the new filter are synthesized with a 2nd order approximation.
All performances shown in the table are for a 13 bit Barker code.

The overall performance of the filter designed by the new method is shown in the following table 2.

TABLE 2

The performance of the new filters for 11 bit and 13 bit Barker codes.

| The new filters | Peak sidelobe | FZPL* | Mean sidelobe | Mean square sidelobe | LSNR** |
|---|---|---|---|---|---|
| 1st order appr. (11) | −24.50 | −79.75 | −35.07 | −32.40 | −0.34 |
| 1st order appr. (13) | −33.95 | −76.49 | −44.42 | −42.13 | −0.15 |
| 2nd order appr. (11) | −31.05 | −68.85 | −39.76 | −37.54 | −0.59 |
| 2nd order appr. (13) | −46.42 | −77.86 | −58.59 | −55.42 | −0.14 |
| 3rd order appr. (11) | −35.75 | −60.80 | −45.63 | −43.13 | −1.06 |
| 3rd order appr. (13) | −53.90 | −61.32 | −69.38 | −65.35 | −1.90 |

*FZPL: The sidelobe level on the first zero point beside the mainlobe which will affect the radar ranging resolution.
**LSNR: The loss in signal to noise ratio.

Table 3 shows the optimized coefficients of the new filters for 11 and 13 bit Barker codes.

TABLE 3

The optimized coefficients of the new filters for 11 and 13 bit Barker codes.

|  | 1st order appr. | | 2nd order appr. | | 3rd order appr. | |
|---|---|---|---|---|---|---|
|  | 11 | 13 | 11 | 13 | 11 | 13 |
| A | 7.0 | 25.0 | 44.0 | 366.6 | 172.1 | 4953.0 |
| B | 1.0 | −1.0 | 4.0 | −27.4 | 8.75 | −420.3 |
| C | 0.0 | 0.0 | 1.0 | 1.0 | 0.0 | 28.48 |
| D | 0.0 | 0.0 | 0.0 | 0.0 | 0.729 | −0.88 |

In table 3, the ratios between the individual coefficients in each column are important. For a filter of the third order approximation and for a 13 bit Barker code, there are the following coefficients from A to D: 4953.0, −420.3, 28.48 and −0.88, of which only three are independent. For the sake of convenience, these three coefficients are normalized by the fourth one. Therefore only three multiplication units are needed in the new filter. The larger the order of approximation, the lower the sidelobe suppression level and the more complex the structure of the filter.

FIG. 3 shows the block diagram for the (R-G2)$_{opt}$ filter (for an 11 bit Barker code). The filter consists of an input 11, an output 12, six delay elements 13–18, denoted by the symbols $Z^{-2N}$ and $Z^{-1}$, two multiplication units 19 and 20 for two independent weights B/A and C/A, and three adders 21–23 denoted by the symbol Σ, and connections between the above-mentioned elements. A signal is received at the input 11 from the output of a matched filter of Barker codes. The delay elements 13–14 denoted by $Z^{-2N}$ have such an effect that the delay in time between the input and the output will be equal to 2N time increment units. The delay elements 15–18 denoted by $Z^{-1}$ have such an effect that the delay between the input and the output will be equal to one time increment unit. The multiplication unit 19 and the multiplication unit 20 both have two inputs. In the adder 21 there are three input signals which are to be added together, and one of these three inputs will be inverted in sign. The adder 22 is similar to the adder 21 except that none of the three inputs is inverted in sign. The adder 23 is equal to the adder 21. The output signal from the $(R\text{-}G\text{-}2)_{opt}$ filter is obtained from the output 12. The optimized coefficients A, B, C, D.. are the most important in the filter, more particularly, the ratios between the different coefficients. In FIG. 3, for example, for a 2nd order approximation and for an 11 bit Barker code, the ratio A:B:C is 44:4:1. In FIG. 3, the normalized optimized coefficient B/A is equal to 4/44 and the normalized optimized coefficient C/A is equal to 1/44. The order of approximation and the length of the utilized binary code have a major effect on the filter structure and the ratio between the different coefficients. The ratios between the different coefficients in the $(R\text{-}G\text{-}2)_{opt}$ filter can be found in the table 3.

The above-mentioned publication A. W. Rihaczek, R. M. Golden, Range Sidelobe Suppression for Barker Codes, IEEE Transactions on Aerospace and Electronic Systems, Vol AES-7, No. 6, Nov. 1971, pp. 1087–1092 is hereby incorporated by reference.

The hardware structure can be realized with digital adders and multipliers. An alternative is to use a microprocessor, such as Intel 8051, to perform all the additions and multiplications according to the instruction given to the processor.

We claim:

1. An optimization method for sidelobe suppression for a pulse compression radar system utilizing a binary coding waveform, said method comprising using a polynomial series with unknown coefficients A, B, C, D, ... to approximate an ideal sidelobe suppression filter transfer function H(f) in a frequency domain, converting the polynomial series from the frequency domain to a time domain by an inverse Fourier transform, optimizing the coefficients A, B, C, D ... so as to minimize output peak sidelobes, and inserting the optimized coefficients A, B, C, D into the transfer function H(f) of the sidelobe suppression filter.

2. The optimization method for sidelobe suppression according to claim 1, where the approximation of the ideal transfer function is obtained by using a finite-termed polynomial sequence with unknown weighting coefficients A, B, C, D ..., where the poly-nomial approximation of the transfer function H(f) is $$H(f) \cong A + B\frac{\sin(2\pi fNT)}{\sin(2\pi fT)} + C\left(\frac{\sin(2\pi fNT)}{\sin(2\pi fT)}\right)^2 +$$

$$D\left(\frac{\sin(2\pi fNT)}{\sin(2\pi fT)}\right)^3$$

where A, B, C, D are the coefficients to be optimized, f is the frequency, N is the length of the utilized binary code and T is the width of sub-pulse of a Barker code.

3. The optimization method for sidelobe suppression according to claim 1, where the optimization of the coefficients A, B, C, D ... of the approximating transfer function H(f) is obtained by using the Linear Programming algorithm in the time domain.

4. The optimization method for sidelobe suppression according to claim 1, where the binary code waveform is an 11 bit or 13 bit Barker code.

5. The optimization method for sidelobe suppression according to claim 1, where the binary code waveform is a truncated PN sequence.

6. The optimization method for sidelobe suppression according to claim 1, where the binary code waveform is a concatenated code.

7. A sidelobe suppression filter for pulse compression radar systems utilizing an 11 bit Barker code as a binary coding waveform, comprising input and output elements, delay elements, adder elements, multiplication elements and connections between said elements, whereby an approximation of the transfer function H(f) of the filter is $$H(f) \cong A + B\frac{\sin(2\pi fNT)}{\sin(2\pi fT)} + C\left(\frac{\sin(2\pi fNT)}{\sin(2\pi fT)}\right)^2 +$$

$$D\left(\frac{\sin(2\pi fNT)}{\sin(2\pi fT)}\right)^3$$

where A, B, C and D are weighting coefficients to be optimized, f is the frequency, N is the length of the Barker code and T is the width of sub-pulse of the Barker code, and the coefficients are optimized so as to minimize an output peak sidelobe and, for a 1st order approximation of the transfer function H(f) and for an 11 bit Barker code, the ratio between the coefficients A:B is equal to 7:1, and C and D are equal to 0.

8. A sidelobe suppression filter for pulse compression radar systems utilizing a 13 bit Barker code as a binary coding waveform, comprising input and output elements, delay elements, adder elements, multiplication elements and connections between said elements, whereby an approximation of the transfer function H(f) of the filter is $$H(f) \cong A + B\frac{\sin(2\pi fNT)}{\sin(2\pi fT)} + C\left(\frac{\sin(2\pi fNT)}{\sin(2\pi fT)}\right)^2 +$$

$$D\left(\frac{\sin(2\pi fNT)}{\sin(2\pi fT)}\right)^3$$

where A, B, C and D are weighting coefficients to be optimized, f is the frequency, N is the length of the Barker code and T is the width of sub-pulse of the Barker code, and the coefficients are optimized so as to minimize an output peak sidelobe and, for a 1st order approximation of the transfer function H(f) and for a 13 bit Barker code, the ratio between the coefficients A:B is equal to 25:−1 and C and D are equal to 0.

9. A sidelobe suppression filter for pulse compression radar systems utilizing an 11 bit Barker code as a binary coding waveform, comprising input and output elements, delay elements, adder elements, multiplication elements and connections between said elements, whereby an approximation of the transfer function H(f) of the filter is $$H(f) \approx A + B \frac{\sin(2\pi f NT)}{\sin(2\pi f T)} + C \left( \frac{\sin(2\pi f NT)}{\sin(2\pi f T)} \right)^2 + D \left( \frac{\sin(2\pi f NT)}{\sin(2\pi f T)} \right)^3$$

where A, B, C and D are weighting coefficients to be optimized, f is the frequency, N is the length of the Barker code and T is the width of sub-pulse of the Barker code, and the coefficients are optimized so as to minimize an output peak sidelobe and, for a 2nd order approximation of the transfer function H(f) and for an 11 bit Barker code, the ratio between the coefficients A:B:C is equal to 44:4:1, and D is equal to 0.

10. A sidelobe suppression filter for pulse compression radar systems utilizing a 13 bit Barker code as a binary coding waveform, comprising input and output elements, delay elements, adder elements, multiplication elements and connections between said elements, whereby an approximation of the transfer function H(f) of the filter is $$H(f) \approx A + B \frac{\sin(2\pi f NT)}{\sin(2\pi f T)} + C \left( \frac{\sin(2\pi f NT)}{\sin(2\pi f T)} \right)^2 + D \left( \frac{\sin(2\pi f NT)}{\sin(2\pi f T)} \right)^3$$

where A, B, C and D are weighting coefficients to be optimized, f is the frequency, N is the length of the Barker code and T is the width of sub-pulse of the Barker code, and the coefficients are optimized so as to minimize an output peak sidelobe and, for a 2nd order approximation of the transfer function H(f) and for a 13 bit Barker code, the ratio between the coefficients A:B:C is equal to 366,6:−27,4:1, and D is equal to 0.

11. A sidelobe suppression filter for pulse compression radar systems utilizing an 11 bit Barker code as a binary coding waveform, comprising input and output elements, delay elements, adder elements, multiplication elements and connections between said elements, and an approximation of the transfer function H(f) of the filter is $$H(f) \approx A + B \frac{\sin(2\pi f NT)}{\sin(2\pi f T)} + C \left( \frac{\sin(2\pi f NT)}{\sin(2\pi f T)} \right)^2 + D \left( \frac{\sin(2\pi f NT)}{\sin(2\pi f T)} \right)^3$$

where A, B, C and D are weighting coefficients to be optimized, f is the frequency, N is the length of the Barker code and T is the width of sub-pulse of the Barker code, and the coefficients are optimized so as to minimize an output peak sidelobe and, for a 3rd order approximation of the transfer function H(f) and for an 11 bit Barker code, the ratio between the coefficients A:B:C:D is equal to 172,1:8,75:0,0:0,729.

12. A sidelobe suppression filter for pulse compression radar systems utilizing a 13 bit Barker code as a binary coding waveform, comprising input and output elements, delay elements, adder elements, multiplication elements and connections between said elements, whereby an approximation of the transfer function H(f) of the filter is $$H(f) \approx A + B \frac{\sin(2\pi f NT)}{\sin(2\pi f T)} + C \left( \frac{\sin(2\pi f NT)}{\sin(2\pi f T)} \right)^2 + D \left( \frac{\sin(2\pi f NT)}{\sin(2\pi f T)} \right)^3$$

where A, B, C and D are weighting coefficients to be optimized, f is the frequency, N is the length of the Barker code and T is the width of the sub-pulse of the Barker code, and where the coefficients are optimized so as to minimize the output peak sidelobe and, for a 3rd order approximation of the transfer function H(f) and for a 13 bit Barker code, the ratio between the coefficients A:B:C:D is equal to 4953,0:−420,3:28,48:−0,88.

* * * * *